United States Patent [19]
Takagi et al.

[11] Patent Number: 5,687,696
[45] Date of Patent: Nov. 18, 1997

[54] ENGINE FUEL SUPPLY DEVICE

[75] Inventors: Yasuo Takagi; Tsutomu Nakada; Ken Naito, all of Yokohama, Japan

[73] Assignee: Nissan Motor Co., Ltd., Kanagawa, Japan

[21] Appl. No.: 670,828

[22] Filed: Jun. 24, 1996

[30] Foreign Application Priority Data

Jun. 30, 1995 [JP] Japan .................. 7-165345

[51] Int. Cl.⁶ .................. F02M 37/04
[52] U.S. Cl. .................. 123/516; 123/456
[58] Field of Search .................. 123/516, 509, 123/470, 514, 456

[56] References Cited

U.S. PATENT DOCUMENTS

| | | | |
|---|---|---|---|
| 3,125,078 | 3/1964 | Reiners | 123/470 |
| 4,485,790 | 12/1984 | Nishimura | 123/470 |
| 4,522,182 | 6/1985 | Mowbray | 123/470 |
| 4,615,323 | 10/1986 | Leblanc | 123/509 |
| 5,083,545 | 1/1992 | Yamashita | 123/509 |
| 5,323,750 | 6/1994 | Rotter | 123/509 |
| 5,392,749 | 2/1995 | Stockner | 123/456 |
| 5,398,658 | 3/1995 | Mesimaki | 123/456 |
| 5,501,197 | 3/1996 | Smith | 123/509 |

FOREIGN PATENT DOCUMENTS

| | | | |
|---|---|---|---|
| 0041630 | 4/1978 | Japan | 123/516 |
| 0200663 | 12/1982 | Japan | 123/516 |
| 0048768 | 3/1983 | Japan | 123/516 |
| 62-237057 | 10/1987 | Japan . | |

*Primary Examiner*—Carl S. Miller
*Attorney, Agent, or Firm*—Lowe, Price, LeBlanc & Becker

[57] ABSTRACT

Fuel in a fuel tank is pressurized by a fuel pump and supplied to a fuel gallery. When a fuel injection valve connecting with this gallery is opened by an electromagnetic signal, fuel is injected from the valve into a combustion chamber of the engine. The fuel gallery is formed inside a cylinder head, and the fuel injection valve is disposed in the cylinder head such that a fuel inlet port of the valve faces the gallery. In this manner, a high pressure fuel passage does not project outside the cylinder head, and there is less risk of fuel leaking from the passage. Further, as the high pressure fuel passage does not project outside the engine, the piping around the engine is simplified.

10 Claims, 4 Drawing Sheets

ENGINE FUEL SUPPLY DEVICE

FIELD OF THE INVENTION

This invention relates to a fuel supply device for a direct injection spark ignition engine.

BACKGROUND OF THE INVENTION

In an engine of a vehicle where fuel is directly injected into a combustion chamber and ignited by a spark plug, the injection takes place under a high pressure of 1 MPa–10 MPa so as to form fine mist of fuel.

Tokkai Sho 62-237057 published by the Japanese Patent Office in 1987 discloses a fuel supply device for this type of engine. In this device, discharge oil from a high pressure fuel pump is led to a fuel gallery on the outside of the engine, and after fuel has first accumulated in this gallery to suppress pressure pulsation in the pump, the fuel is led from the gallery to an electromagnetic fuel injection valve provided in each combustion chamber, and injected into the chambers from the valves.

In this device, the main part of the passage leading from the high pressure fuel pump to the injection valve is formed on the outside of the engine, and the various component parts of the passage are interconnected by connectors.

If these connectors are damaged due for example to a collision of the vehicle, therefore, high pressure fuel may leak, and moreover, by having a high pressure fuel passage comprising the fuel gallery on the outside of the engine, the piping for fuel supply is rendered more complex.

SUMMARY OF THE INVENTION

It is therefore an object of this invention to make the construction of a passage leading from a high pressure fuel pump to a fuel injection valve more robust, and thereby to prevent leakage of fuel.

It is a further object of this invention to simplify piping around an engine.

In order to achieve the above objects, this invention provides a fuel supply device for use with an engine which comprises a fuel tank, cylinder head and combustion chamber having an opening in the cylinder head. The device comprises a fuel pump which pressurizes fuel in the fuel tank, a fuel gallery which guides fuel discharged by the fuel pump, and a fuel injection valve disposed in a transverse direction to the gallery. The gallery is formed inside the cylinder head and the fuel injection valve comprises an end part which injects fuel from the gallery into the combustion chamber, a base part projecting outside the cylinder head, and a fuel inlet port facing the gallery.

It is preferable that the fuel pump is fitted to the cylinder head.

It is further preferable that the device further comprises a block member to be fixed to the cylinder head, wherein the gallery is pre-formed in the block member, and the fuel pump and fuel injection valve are pre-attached to the block member.

It is also preferable that a cooling water passage is provided around the gallery in the cylinder head.

It is also preferable that the device further comprises a pressure-regulating valve which maintains a discharge pressure of the fuel pump within a predetermined range.

It is also preferable that the device further comprises a mechanism for detecting a fuel pressure in the gallery after the engine has stopped, a mechanism for detecting a fuel temperature in the gallery after the engine has stopped, a mechanism for setting a predetermined pressure in the vicinity of a saturation vapor pressure of the fuel according to the fuel temperature, and a mechanism for returning fuel in the gallery to the fuel tank when the fuel pressure is less than the predetermined pressure.

The details as well as other features and advantages of this invention are set forth in the remainder of the specification and are shown in the accompanying drawings.

DESCRIPTION OF THE PREFERRED EMBODIMENTS

Figure 1:
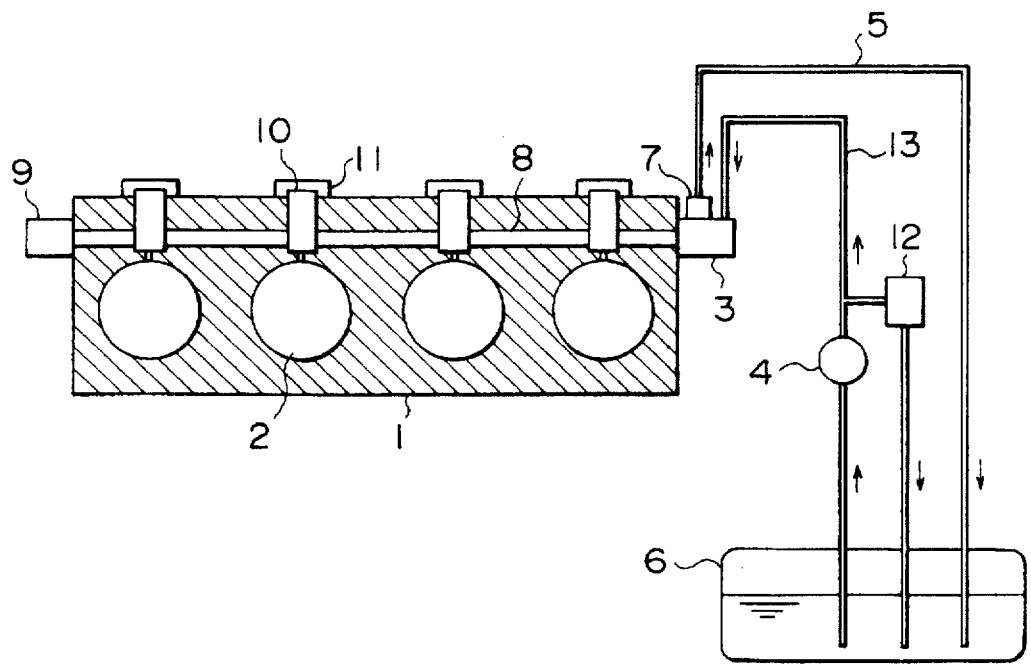
FIG. 1 is a schematic diagram of a fuel supply device according to this invention.

Referring to FIG. 1 of the drawings, a combustion chamber 2 opens into a cylinder head 1 of a multi-cylinder gasoline engine.

A fuel injection valve 10 which opens and closes electromagnetically is provided at a predetermined position in the cylinder head 1 facing each of the chambers 2.

A high pressure fuel pump 3 which pressurizes fuel is fixed on the outside of the cylinder head 1. This pump 3 pressurizes fuel sent from a low pressure fuel pump 4, to a high pressure of 1 MPa–10 Mpa. The low pressure fuel pump 4 aspirates fuel from a fuel tank 6, pressurizes it to a predetermined low pressure, and supplies fuel to the high pressure fuel pump 3 via a low pressure fuel pipe 13. A low pressure fuel regulating valve 12 is also provided which allows fuel to escape into the fuel tank 6 when the discharge pressure at the discharge port of the pump 4 reaches a predetermined or higher value.

A fuel gallery 8 is formed in the alignment direction of the chambers 2 inside the cylinder head 1. Both ends of the gallery 8 open onto the sides of the cylinder head 1, one of these openings being connected to the discharge port of the high pressure fuel pump 3 and the other opening being connected to an accumulator 9 so as to absorb pressure pulsation.

A high pressure regulating valve 7 is connected to the discharge port of the pump 3, this valve 7 opening and recycling fuel via a return pipe 5 to the fuel tank 6 when the pump discharge pressure has risen to or above a predetermined value. The pressure of the fuel discharged from the pump 3 is thereby always maintained constant. The low pressure fuel pump 4 and high pressure fuel pump 3 are both driven by the engine.

The fuel injection valves 10 are disposed in the cylinder head 1 in a transverse direction to the fuel gallery 8. Each combustion chamber 2 has one fuel injection valve 10, a nozzle at the end of the valve facing the inside of the chamber 2, the base projecting outside the cylinder head 1, and the projecting end being covered by a cover 11. There is also a fuel inlet port, not shown, in a position facing the fuel gallery 8 on the side of the valve 10.

High pressure fuel supplied to the gallery 8 from the pump 3 is injected into the chamber 2 from the valve 10 which opens and closes electromagnetically. Pressure pulsations in the gallery 8 are absorbed by the accumulator 9 which is also fixed on the outside of the cylinder head 1.

Hence, by forming the gallery 8 inside the cylinder head 1, the risk of high pressure fuel leaking outside the engine is largely reduced. The high pressure regulating valve 7 and accumulator 9 maintain the pressure of the gallery 8 at a predetermined high pressure, so fuel injected by the valve 10 is always injected into the chamber 2 at a predetermined high pressure. However, as the pressure in the chamber 2 is near atmospheric during the injection, the injected fuel is converted to superfine droplets due to the effect of vaporization by the sudden pressure reduction.

Figure 2:
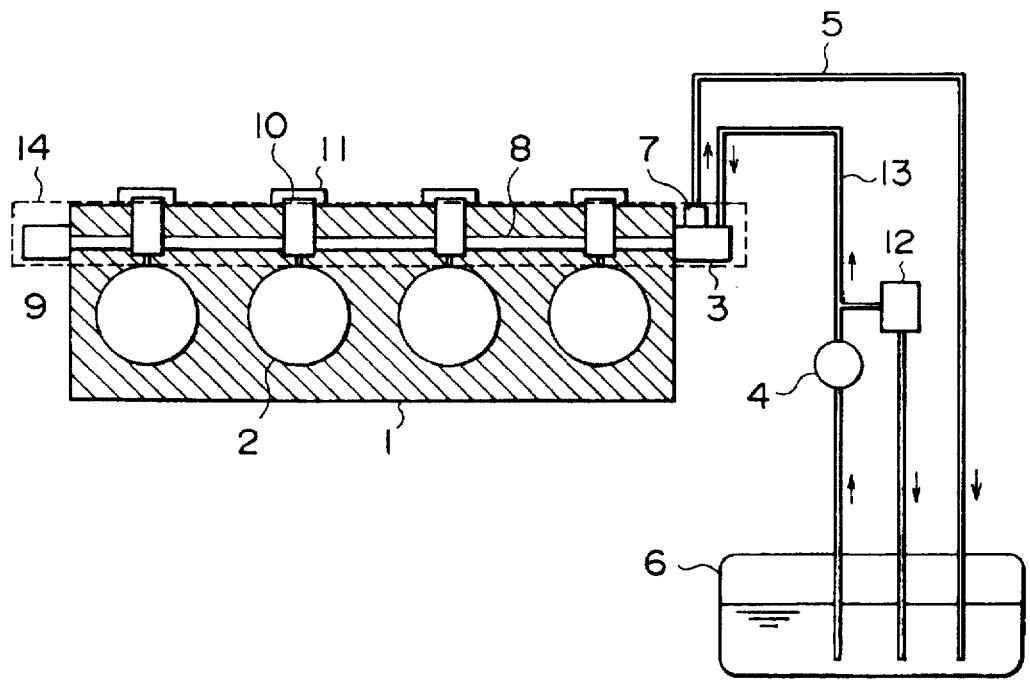
FIG. 2 is a schematic diagram of a fuel supply device according to a second embodiment of this invention.

FIG. 2 shows a second embodiment of this invention.

According to this embodiment, a high pressure fuel pump 3, high pressure regulating valve 7, accumulator 9 and fuel injection valve 10 are fixed to a block 14 comprising the gallery 8 inside it.

This block 14 is fixed to the cylinder head 1 such that the nozzle of the valve 10 faces the combustion chamber 2. Hence, by forming high pressure fuel flow parts in a one-piece construction on the block 14 and fixing the block to the cylinder head 1 in this manner, manufacture and assembly of the fuel supply device is made easier.

Figure 3:
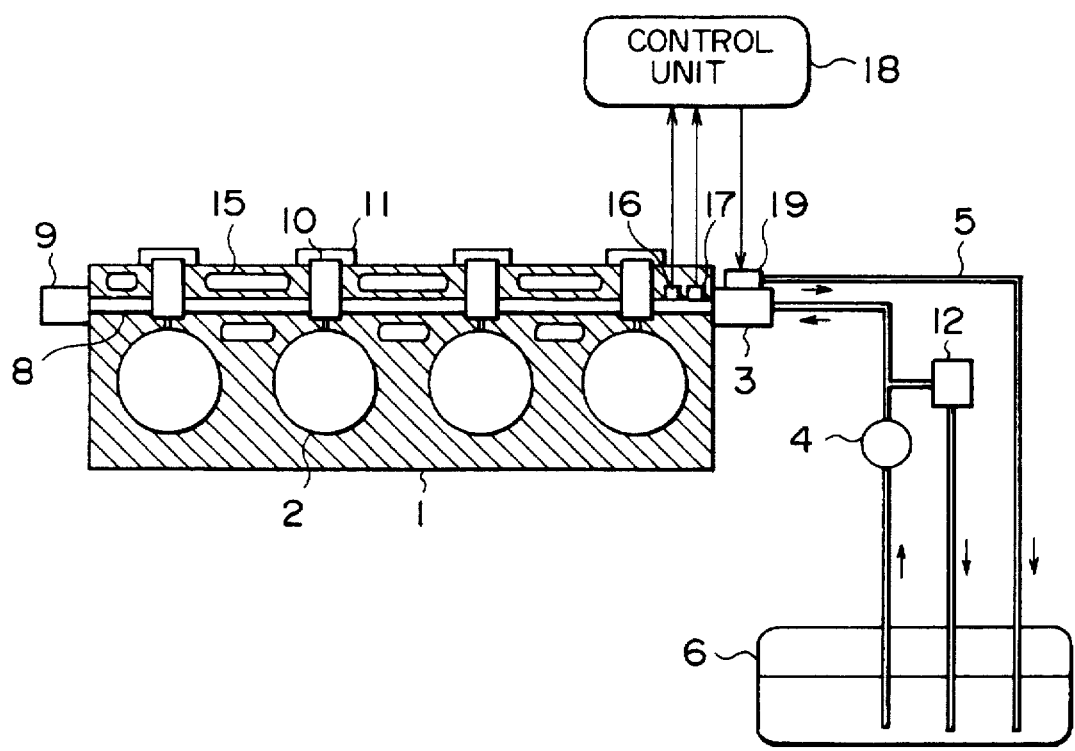
FIG. 3 is a schematic diagram of a fuel supply device according to a third embodiment of this invention.
Figure 4:
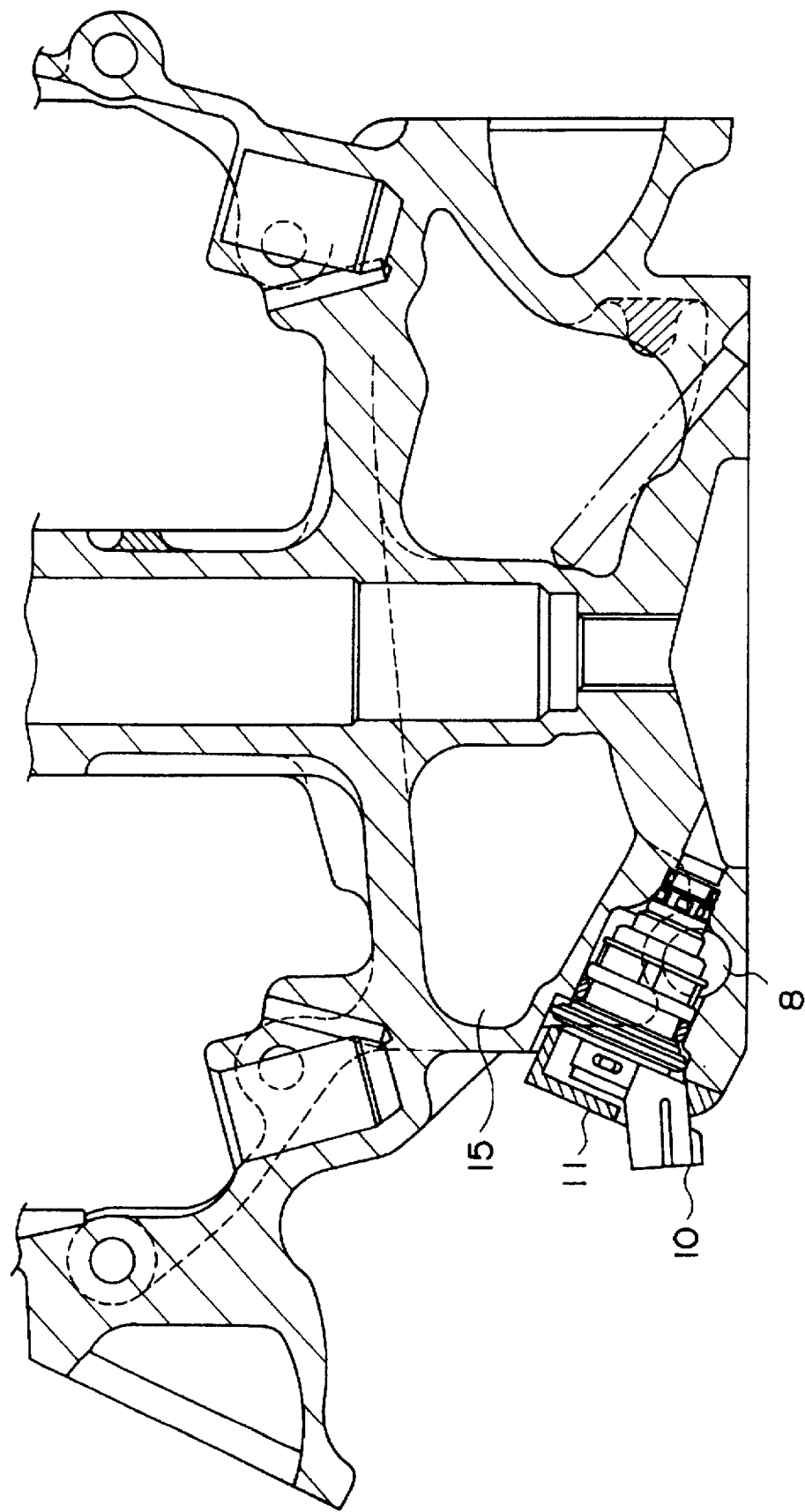
FIG. 4 is a vertical sectional view of a cylinder head according to the third embodiment of this invention.
Figure 5:
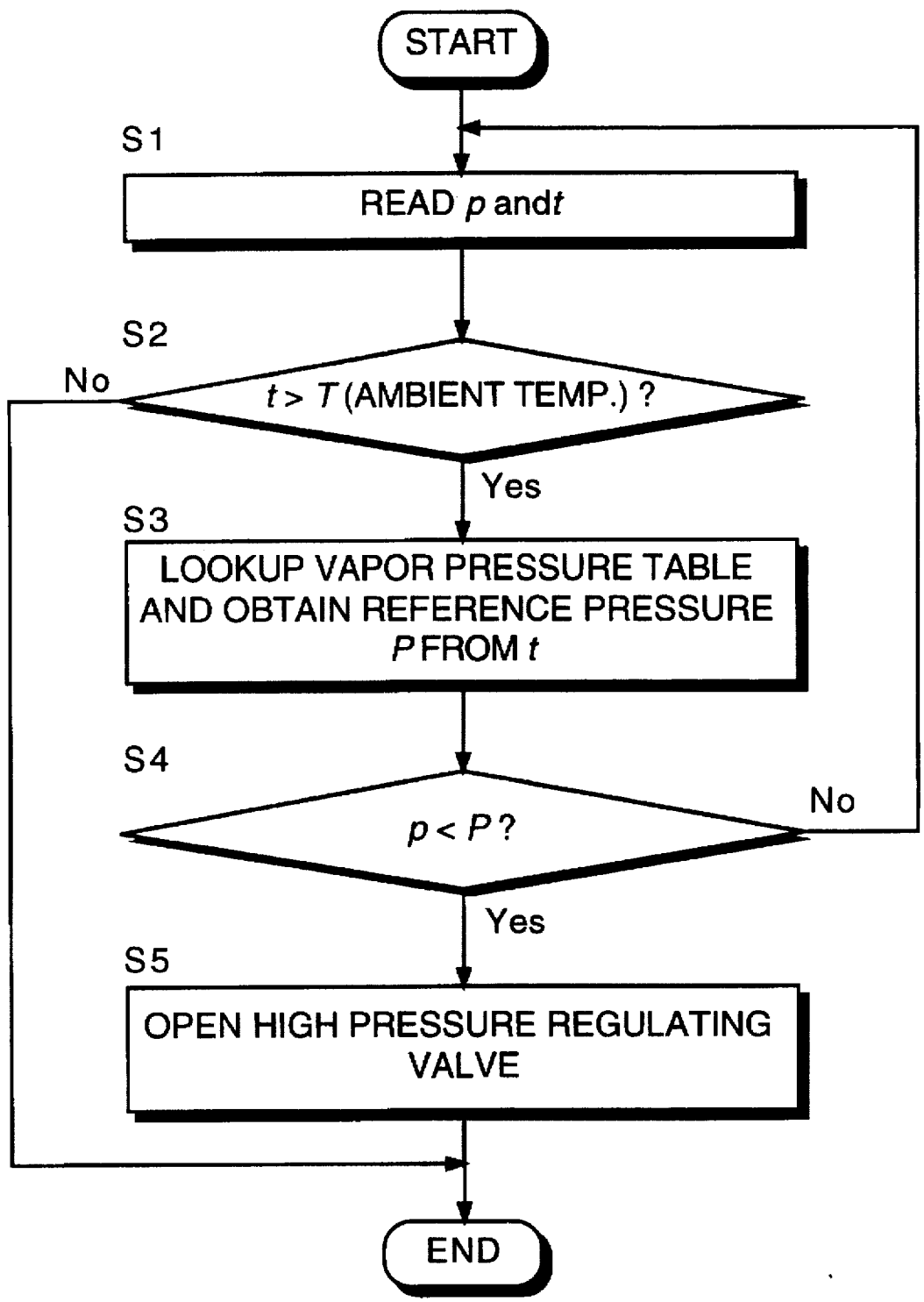
FIG. 5 is a flowchart showing a fuel pressure control process according to the third embodiment of this invention.

FIGS. 3, 4 and 5 show a third embodiment of this invention.

When the fuel gallery 8 is formed inside the cylinder head 1, the gallery 8 cannot be cooled by outside air, so the temperature inside the gallery 8 is higher than in the conventional case where the gallery 8 is disposed on the outside of the cylinder head 1.

In general, as the saturation vapor pressure increases with temperature rise, bubbles tend to form easily in fuel inside the gallery 8 when the gallery is at a high temperature. These bubbles form when the pressure in the gallery 8 falls to less than the saturation vapor pressure of the fuel. When bubbles form in the fuel, fuel injection by the valve 10 becomes unstable and this has an adverse impact on engine performance.

Under normal running conditions, the temperature of the cylinder head 1 is effectively equal to the engine cooling water temperature, and lies in the vicinity of 80° C. The saturation vapor pressure of fuel at 80° C. is 0.5 MPa or less, hence if the temperature is maintained at the same level as that of the engine cooling water while the inside of the gallery is held at a high pressure of 1 MPa or more, the formation of bubbles can be prevented.

According to this embodiment, therefore, a plurality of cooling water passages 15 are disposed around the gallery 8 as shown in FIGS. 3 and 4 so that the fuel in the gallery 8 is cooled.

Further according to this embodiment, a pressure sensor 16 and temperature sensor 17 are installed in the gallery 8 as shown in FIG. 3, and a control unit 18 opens and closes a high pressure regulating valve 19 depending on output signals from these sensors. This prevents bubbles forming in the fuel in the gallery 8 after the engine has stopped.

After the engine has stopped, when the fuel pressure in the gallery 8 is higher than a reference pressure which is preset according to the fuel temperature, the setting of the valve 19 whereby the valve opens at a high pressure equal to or greater than a predetermined pressure is maintained. However when the fuel pressure falls to less than the reference pressure, the valve 19 is forcibly opened, and fuel in the gallery 8 is returned via the return pipe 5 to the fuel tank 6. The aforesaid reference pressure is set slightly higher than the saturation vapor pressure at different fuel temperatures.

This control process will now be described using the flowchart of FIG. 5.

First, in a step S1, a fuel pressure p is read from the output signal of the pressure sensor 16, and a fuel temperature t is read from the output signal of the temperature sensor 17.

In a step S2, the fuel temperature t is compared with a predetermined temperature T (ambient temperature), and when $t \leq T$, the routine is terminated. When $t > T$, the routine proceeds to a step S3 and subsequent steps.

In the step S3, a pre-stored vapor pressure table is searched, and a reference pressure p is read from the fuel temperature t. The vapor pressure table is a table of reference pressures P set to be slightly higher than the saturation vapor pressure. In the table, the reference pressure P is expressed in the form of data as a function of fuel temperature.

In a step S4, the detected fuel pressure p is compared with the reference pressure P read from the table. When $p > P$, as there is no risk of bubbles forming in the gallery 8, the valve 19 is held in its current state and the pressure in the gallery 8 is maintained. After a predetermined time has elapsed, the processing from the step S1 is then repeated.

However when $p \leq P$, the conditions are close to those under which bubbles form in the fuel in the gallery 8. In this case, the routine proceeds to a step S5, the valve 19 is opened, and fuel in the gallery 8 is returned to the fuel tank 6.

By executing the aforesaid routine at a fixed time after the engine has stopped, the formation of bubbles in the fuel in the gallery 8 is prevented, and the engine is easily re-started.

The embodiments of this invention in which an exclusive property or privilege is claimed are defined as follows:

1. A fuel supply device for use with an engine including a fuel tank, cylinder head and combustion chamber having an opening in said cylinder head, said device comprising:

a fuel pump which pressurizes fuel in said fuel tank, a fuel gallery which guides fuel discharged by said fuel pump, said gallery being formed inside said cylinder head, a fuel injection valve disposed in a transverse direction to said gallery, said valve comprising an end part which injects fuel from said gallery into said combustion chamber, a base part projecting outside said cylinder head, and a fuel inlet port facing said gallery, means for detecting a fuel pressure in said gallery after said engine has stopped, means for detecting a fuel temperature in said gallery after said engine has stopped, means for setting a predetermined pressure in the vicinity of a saturation vapor pressure of said fuel according to said fuel temperature, and means for returning fuel in said gallery to said fuel tank when said fuel pressure is less than said predetermined pressure.

2. A method of supplying fuel to an engine having a fuel tank, a fuel pump configured to pump fuel from the fuel tank, a fuel gallery configured to guide fuel discharged by the fuel pump, a combustion chamber configured to ignite fuel, and a fuel injection valve configured to inject fuel from the gallery into the combustion chamber, comprising the steps of:

detecting a fuel pressure in said gallery after said engine has stopped, detecting a fuel temperature in said gallery after said engine has stopped, setting a predetermined pressure in the vicinity of a saturation vapor pressure of said fuel according to said fuel temperature, and returning fuel from said gallery to said fuel tank when said fuel pressure is less than said predetermined pressure.

3. A system for supplying fuel to an engine, comprising:

a fuel tank;

a fuel pump configured to pump fuel from the fuel tank;

a fuel gallery configured to guide fuel discharged by the fuel pump to a fuel combustion chamber;

a pressure sensor configured to detect a fuel pressure in said gallery after said engine has stopped;

a temperature sensor configured to detect a fuel temperature in said gallery after said engine has stopped;

a controller configured to set a reference pressure in the vicinity of a saturation vapor pressure of said fuel based upon the detected fuel temperature, to compare the reference pressure with the detected fuel pressure and to generate a signal if said detected fuel pressure is less than said reference pressure; and a valve configured to return fuel from said gallery to said fuel tank responsive to said signal.

4. A fuel supply device as defined in claim 1, wherein said fuel pump is fitted to said cylinder head.

5. A fuel supply device as defined in claim 4, further comprising a block member to be fixed to said cylinder head, wherein said gallery is pre-formed in said block member, and said fuel pump and fuel injection valve are pre-attached to said block member.

6. A fuel supply device as defined in claim 1, wherein a cooling water passage is provided around said gallery in said cylinder head.

7. A fuel supply device as defined in claim 1, further comprising a pressure-regulating valve which maintains a discharge pressure of said fuel pump within a predetermined range.

8. A fuel supply method according to claim 2, further comprising the step of:

maintaining a discharge pressure of the fuel pump within a predetermined range.

9. A fuel supply system according to claim 3, further comprising:

a regulator configured to maintain a discharge pressure of the fuel pump within a predetermined range.

10. A fuel supply system according to claim 3, further comprising:

a cooling water passage configured to cool the fuel in said gallery.

* * * * *